United States Patent [19]

Scotti

[11] Patent Number: 5,513,734
[45] Date of Patent: May 7, 1996

[54] VEHICLE CLUTCH ASSEMBLY

[75] Inventor: Alessandro Scotti, Modena, Italy

[73] Assignee: New Holland North America, Inc., New Holland, Pa.

[21] Appl. No.: 254,019

[22] Filed: Jun. 3, 1994

[30] Foreign Application Priority Data

Jun. 7, 1993 [IT] Italy .................. TO93A0408

[51] Int. Cl.⁶ .................................. F16D 13/50
[52] U.S. Cl. .................. 192/70.27; 192/70.29; 192/70.3; 192/995
[58] Field of Search ............ 192/70.27, 70.29, 192/70.28, 70.3, 995

[56] References Cited

U.S. PATENT DOCUMENTS

| | | | |
|---|---|---|---|
| 2,259,730 | 10/1941 | Burtnett | 192/70.27 X |
| 2,613,778 | 10/1952 | Carlson | 192/70.29 X |
| 4,116,322 | 9/1978 | Ashfield | 192/70.29 X |
| 4,210,232 | 7/1980 | Beccaris | 192/70.29 X |
| 4,236,620 | 12/1980 | Beccaris | 192/70.27 X |

*Primary Examiner*—Andrea L. Pitts
*Attorney, Agent, or Firm*—Larry W. Miller; Frank A. Seemar

[57] ABSTRACT

A vehicle clutch assembly, particularly for tractors, is provided having a first clutch interposed between the vehicle drive shaft and transmission, and a second clutch interposed between the drive shaft and an output shaft defining the power take-off of the vehicle. The assembly further comprises an elastic device for maintaining the second clutch in the released position wherein the output shaft is operatively disconnected from the drive shaft and a manually operated activating device for exerting a force in opposition to that of the elastic device, and setting the second clutch to the engaged position wherein the two shafts are operatively interconnected.

10 Claims, 4 Drawing Sheets

VEHICLE CLUTCH ASSEMBLY

BACKGROUND OF THE INVENTION

The present invention relates to a vehicle clutch assembly, particularly for agricultural or industrial tractors.

In a known manner, standard tractor clutch assemblies normally comprise a first and a second disk clutch, the first disk clutch being interposed between the tractor motor drive shaft and the transmission, and the second disk clutch being interposed between said motor drive shaft and an output shaft defining the power take-off (PTO) for providing rotational power to eventual implements carried or pulled by the tractor.

In most cases, the two clutches are arranged side by side, and are normally maintained in the closed or engaged position by a common elastic element interposed between the end disks of the two clutches. The first clutch is normally opened or released using the clutch pedal, while the second clutch, which is used less frequently than the first, is normally opened or released and maintained in the released position by means of a hand-operated lever connected by a Bowden cable to a lever device controlling the second clutch and presenting a number of rigid connecting members for exerting a force in a direction opposite to that exerted by the elastic element.

Though widely used, known clutch assemblies of the above type may be the cause of injury to the tractor operator or any bystanders in the vicinity of the tractor when the second clutch is maintained in the released position by the lever. In this condition, in fact, in the event of accidental breakage of any of said connecting members or the Bowden cable, the second clutch is immediately brought in the engaged position under influence of the elastic element between the two clutches, thus inadvertently and unintentionally activating the power take-off and the eventual implement connected to it.

SUMMARY OF THE INVENTION

It is therefore an object of the present invention to provide a vehicle clutch assembly designed to overcome the above drawback, which is both cheap and simple to produce, provides for a high degree of functional reliability and ensures a smooth engagement of the assembly.

According to the present invention, there is provided a vehicle clutch assembly, particularly for tractors, comprising a first and a second clutch; the first clutch being interposed between the motor drive shaft and the transmission of the vehicle; and the second clutch being interposed between said drive shaft and an output shaft defining the power take-off of the vehicle.

The vehicle is characterized in that it comprises elastic means for maintaining the second clutch in a released position wherein said output shaft is drivingly disconnected from the drive shaft.

The vehicle further comprises manually operated actuating means for controlling the second clutch, exerting a force in a direction opposite to that exerted by said elastic means, and setting the second clutch to an engaged position wherein said shafts are drivingly connected.

BRIEF DESCRIPTION OF THE DRAWINGS

A vehicle clutch assembly embodying the present invention will now be described in greater detail, by way of example, with reference to the accompanying drawings, in which.

DETAILED DESCRIPTION OF THE PREFERRED EMBODIMENT

Figure 1:
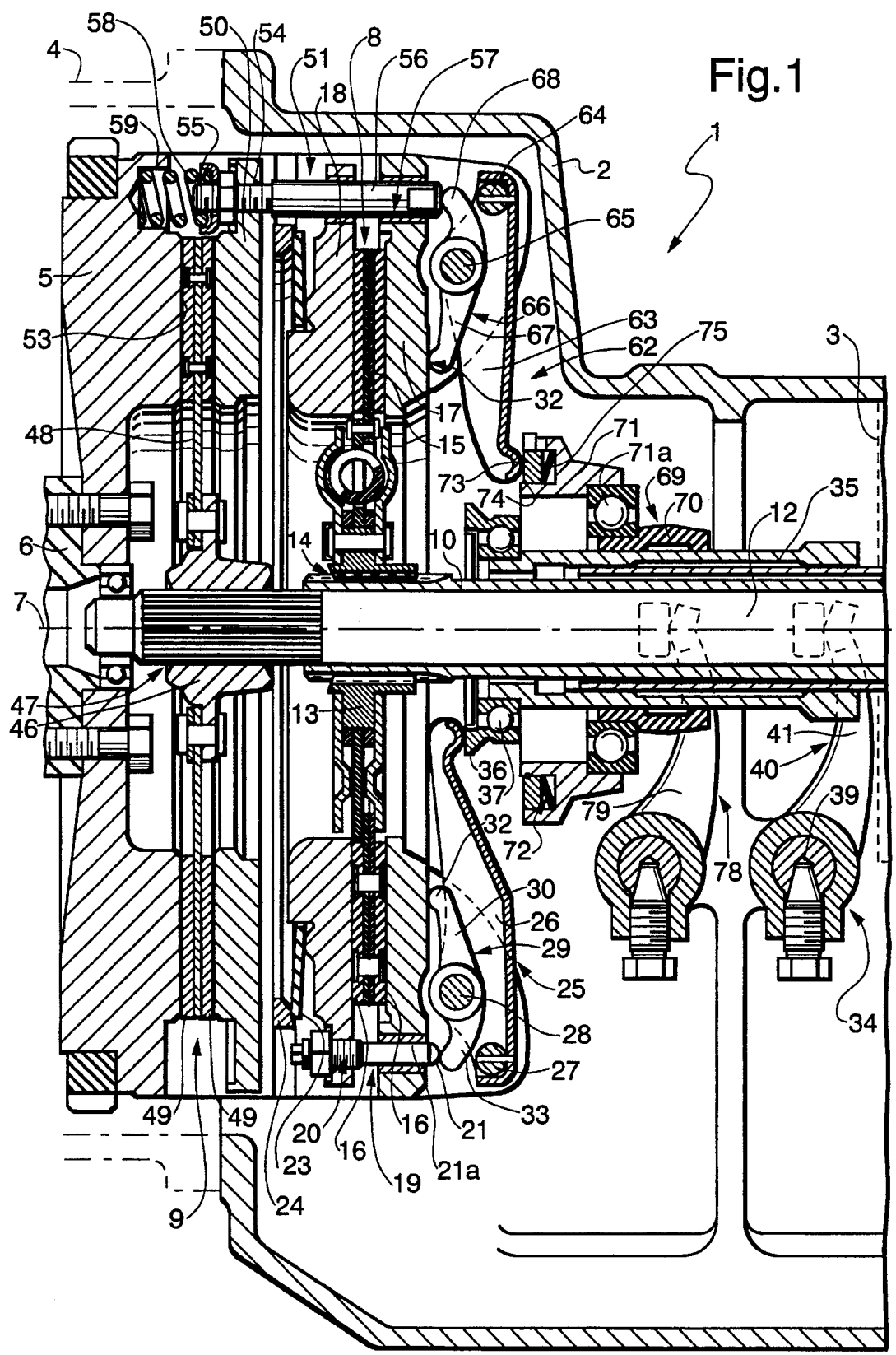
FIG. 1 shows a partial sectional view of a preferred embodiment of the clutch assembly according to the present invention.

A vehicle clutch assembly, particularly for tractors, is generally indicated by 1 in FIG. 1. Assembly 1 comprises an elongated outer casing 2 having a first opening closed by a plate 3, and communicating, via a second opening facing the first opening, with the interior of a further casing 4 integral with casing 2 and housing a flywheel 5 connected to the output shaft 6 of an engine (not shown) and defining an axis 7.

Casing 2 houses two clutches 8 and 9 disposed adjacent to each other along axis 7. Clutch 8 is operable to connect flywheel 5 to a first hollow drive shaft 10 extending coaxially with axis 7 through an opening in plate 3, and connected in known manner (not shown) to the input shaft of a transmission (not shown) of the vehicle (not shown). Clutch 9 on the other hand is operable to connect flywheel 5 to a second drive shaft 12 extending coaxially with axis 7 inside shaft 10, and projecting outwardly from the distal end of shaft 10 and beyond a casing (not shown) housing the transmission (not shown) so as to define the power take-off of the vehicle (not shown).

Clutch 8, which is conventional in the art, comprises a hub 13 fitted to an intermediate portion of shaft 10 by means of a splined coupling 14. The hub 13 is provided, in angularly fixed manner, with a disk 15, arranged coaxially with axis 7 and provided with respective annular disks 16 of frictional material on the opposite surfaces thereof. Clutch 8 also comprises two further disks 17 and 18 on either side of disk 15 and coaxial with axis 7; disk 17 being fixedly connected in known manner (not shown) with flywheel 5 and disk 18 being connected to disk 17 in angularly integral and axially sliding manner by means of a number of pins 19 (only one shown), so as to rotate with, move to and from, and compress disks 15 and 16 against disk 17. More specifically, each pin 19 presents an end portion 20 connected integrally with disk 18 and an opposite end portion 21 engaging in axially sliding manner a respective hole 21a in disk 17, and projecting partially outwardly of disk 17.

Disk 18 is normally maintained in the forward, operative position (being the right hand direction of FIG. 1), corresponding to closure or engagement of clutch 8, by a Belleville spring 23 interposed between disk 18 and an annular stop body 24 integrally connected to disk 17 whereas clutch 8 is opened or released by means of a manually operated control device 25 which is operable to exert a force on disk 18 in opposite direction to the force exerted by spring 23, such as to move disks 18 and 17 apart and move disk 18 into a withdrawn position.

More specifically, device 25 comprises a number of radial levers 26 equiangularly spaced on the side 32 of disk 17 facing away from disks 15 and 16, and each presenting a peripheral end portion hinged, by means of a respective pin 27 arranged perpendicularly to axis 7, to a respective peripheral portion of disk 17 adjacent to a respective pin 19, so as to swing about the axis of a respective pin 27. By means of a pin 28 parallel to and spaced transversely in relation to a respective pin 27, each lever 26 hingeably supports an intermediate portion of a rocker arm 29, a first arm 30 of which presenting an end portion contacting the outer surface 32 of disk 17, and the second arm 33 of which presenting an end portion contacting the front surface of portion 21 of a respective pin 19.

Levers 26 are rotated in relation to disk 17 and about respective pins 27 by a control assembly 34 forming part of the device 25 and comprising a sleeve 35 fitted in axially sliding and angularly fixed manner to an intermediate portion of shaft 10, and supporting a collar 36 which cooperates with the free end portion of levers 26 and is fitted to sleeve 35 via the interposition of a bearing 37 enabling the collar 36 to rotate about axis 7.

Sleeve 35 is movable along shaft 10, between a withdrawn, idle position corresponding to closure or engagement of clutch 8, and a forward, operative position corresponding to opening or release of clutch 8, by means of a lever 38 (shown in FIG. 2), the intermediate portion of which is hinged to casing 2 so as to rotate, in relation to casing 2, about an axis 39 oriented perpendicularly relative to axis 7. Lever 38 comprises a fork 40, the arms 41 of which are connected in known manner to sleeve 35, and an arm 43 connected in known manner to the clutch pedal (not shown) of the tractor preferably by means of a flexible connecting member 45.

Again with reference to FIG. 1, clutch 9 comprises a hub 46 fitted by means of a splined coupling 47 to an intermediate portion of shaft 12 projecting from shaft 10 towards flywheel 5, and fitted in angularly fixed manner with a disk 48 coaxial with axis 7. Comparable to the arrangement of disk 15, disk 48 is provided, on the opposite surfaces thereof, with respective annular disks 49 of frictional material. Clutch 9 further comprises a thrust disk 50 provided coaxially with axis 7 on the opposite side of disks 48 and 49 relative to the flywheel 5, and connected in axially sliding and angularly fixed manner to disk 17 by means of a number of pins 51 (only one shown) so as to compress disks 48 and 49 against a contact surface 53 formed on the side of the flywheel 5 facing in the direction of disks 48, 49 and being provided parallel thereto. More specifically, each pin 51 comprises an end portion 54 integrally connected with disk 50; the end portion 54 in turn having an end portion 55 projecting outwardly of disk 50 towards flywheel 5. Each pin 51 further comprises an opposite end portion 56 engaging, in axially sliding manner, respective coaxial holes 57 in disks 17 and 18, and projecting partially outwardly of disk 17. Each said end portion 55 of pins 51 is fitted with a respective compression spring 58, one end portion of which is positioned against a shoulder on respective pin 51, and the opposite end portion of which engages a respective axial seat 59 formed in a peripheral portion of flywheel 5. The rigidity of springs 58 is such as to normally maintain disk 50 withdrawn from flywheel 5 in a position corresponding to opening or release of clutch 9. It will be appreciated that in the example shown in FIG. 1 only little force is needed to move the disk 50 away from the flywheel 5 and therefore the rigidity of the springs 58 may be small. The closed or engaged condition of clutch 9 is achieved by moving disk 50 axially towards flywheel 5 by means of a lever control device 62 which is operable to exert a force on disk 50 in a direction opposite to the direction of the force exerted by springs 58.

Device 62 comprises a number of radial levers 63 which extend on the same side of disk 17 as levers 26 and are angularly offset in relation thereto. The design and operation of the levers 63 are comparable to the levers 26. More specifically, a respective peripheral portion of each lever 63 is hinged, by means of a respective pin 64 oriented perpendicularly relative to axis 7, to a respective peripheral portion of disk 17 adjacent to a respective pin 51, enabling each lever 63 to rotate about the axis of an associated pin 64.

By means of a pin 65 parallel to and spaced transversely in relation to a respective pin 64, each lever 63 hingeably supports an intermediate portion of a respective rocker arm 66, a first arm 67 of which presenting an end portion contacting the outer surface 32 of disk 17, fixed in relation to the axis of pin 64, and the second arm 68 of which presenting an end portion contacting the front surface of portion 56 of a respective pin 51 which acts as a push rod.

Levers 63 are rotated in relation to disk 17 and about respective pins 64 by a control assembly 69 forming part of device 62 and comprising a sleeve 70 extending coaxially and outwardly of sleeve 35 and fitted to the outer surface of sleeve 35 in axially sliding and angularly fixed manner. Sleeve 70 supports a collar 71 extending outwardly thereof and fitted rotatably but axially fixed relative to sleeve 70 by means of a bearing 71a. The collar 71 has a front groove 72 on the side facing clutch 8 in which a ring 73 is housed partially engaging groove 72 in axially sliding and angularly fixed manner. The ring 73 is retained inside groove 72 by a retaining ring 74 and presents a front outer surface contacting the free end portions of levers 63 against which ring 73 is forced by a compression spring 75, in this case a Belleville spring, housed inside groove 72. According to an alternative embodiment (not shown), as opposed to being housed inside groove 72, spring 75 may be interposed between the outer ring of bearing 71a and an inner radial flange formed integrally with collar 71.

Figure 2:
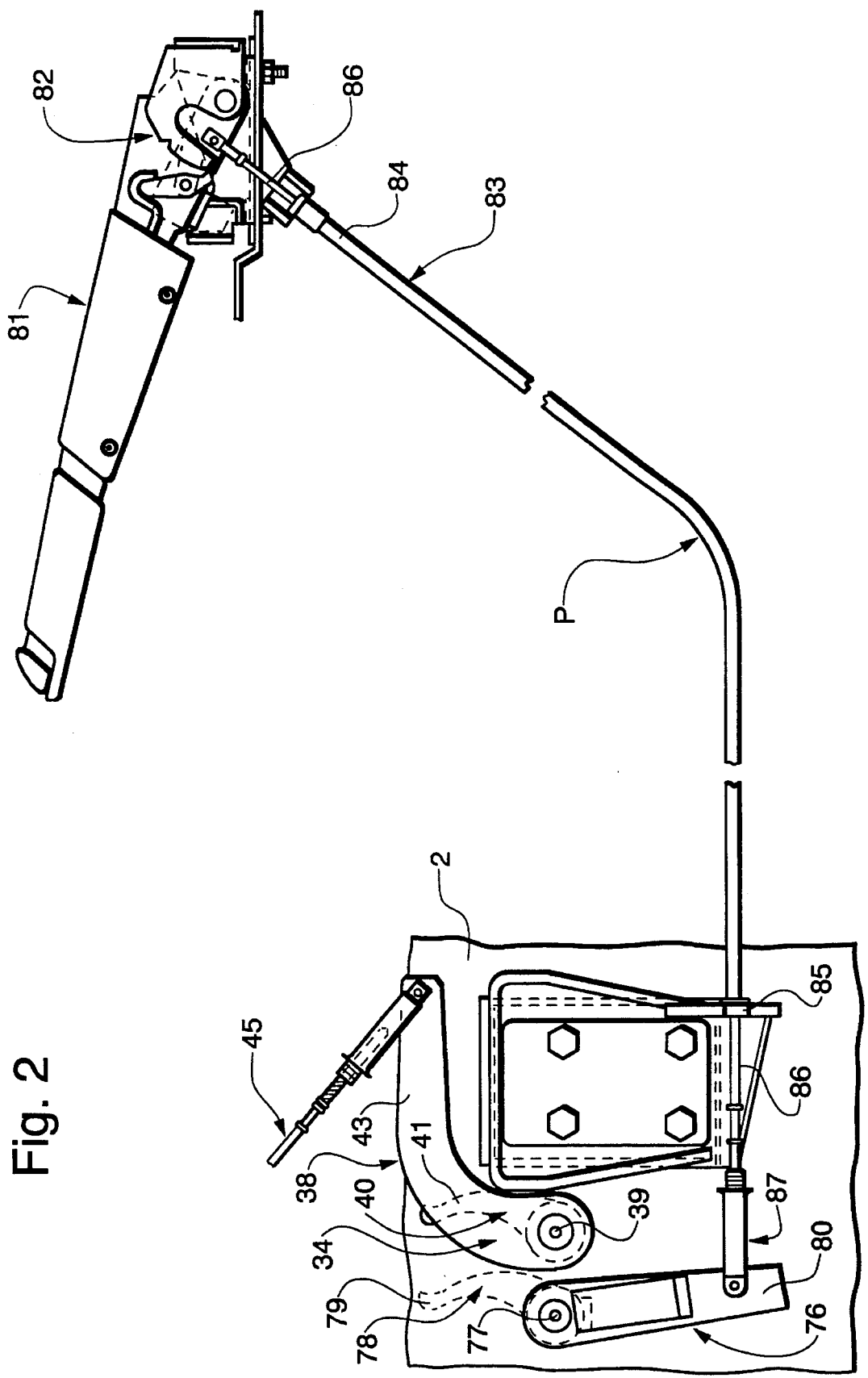
FIG. 2 shows a device for operating the clutch assembly of FIG. 1.

Referring more specifically to FIGS. 1 and 2, sleeve 70 is movable along axis 7 and in relation to sleeve 35, between a forward, operative position corresponding to closure or engagement of clutch 9, and a withdrawn, idle position corresponding to opening or release of clutch 9, by means of a rocking lever 76 forming part of assembly 69, located adjacent to lever 38, and having an intermediate portion hinged to casing 2 so as to rotate, in relation to casing 2, about an axis 77 parallel to axis 39.

Lever 76 comprises on the one hand a fork 78, the arms 79 of which are connected in known manner to sleeve 70, and on the other hand an arm 80 extending on the opposite side of said intermediate portion of lever 76 in relation to fork 78, and connected to a hand-operated lever 81 comprising an angular locking device 82 for locking lever 81 in two given angular positions, only one of which being shown in FIG. 2. More specifically, lever 81 is connected to the arm 80 by a flexible connection 83 comprising a sheath 84 extending along a given path P between a fixed point adjacent to lever 81, and a plate 85 fitted integrally with casing 2 and adjacent to the arm 80. Sheath 84 houses a cable 86, one end of which is operatively connected with lever 81, and the opposite end of which is operatively connected in a conventional manner with a member 87 connecting cable 86 to arm 80.

The functional operation of assembly 1 will now be described in more detail, commencing with both sleeves 35 and 70 being located in the withdrawn position (towards the right hand side of FIG. 1), whereby clutch 8 is engaged (with disks 15 and 16 compressed against disk 17 by disk 18 and spring 23), and clutch 9 is released (with disk 50 maintained in the withdrawn position by springs 58).

Starting from the above condition, to activate the power take-off, i.e. to connect flywheel 5 and shaft 12 angularly fixed with respect to each other, lever 81 is operated so as to rotate lever 76 anticlockwise (with reference to FIG. 2) about axis 77 by means of the connection 83, thereby moving sleeve 70 in relation to shaft 10 and to sleeve 35 into the forward position wherein ring 73 presses on the free ends of the levers 63 and rotates levers 63 about the axes of respective pins 64. As sleeve 70 is displaced, spring 75 provides for regulating the force with which clutch 9 is engaged, thus ensuring smooth, gradual engagement.

Following rotation of levers 63, rocker arms 66 rotate anticlockwise (with reference to FIG. 1) about the axes of respective pins 65 so as to move respective pins 51, which in this case act as push rods, towards flywheel 5 together with disk 50. As disk 50 approaches flywheel 5, springs 58 are gradually compressed and disks 48 and 49 are pressed against flywheel 5 thereby engaging clutch 9, connecting shaft 12 angularly to flywheel 5 and activating the power take-off.

In the event that the rigidity of the springs 58 is far less than the rigidity of the spring 75, then it will be understood that by moving the lever 81 to a position for pulling on the lever 76, first the springs 58 will be compressed whereby the disk 50 is moved to gradually engage the adjacent disk 49 whereafter the spring 75 becomes gradually compressed and ensures that the clutch 9 is always fully engaged with the same force.

Further inherent to the present invention, as soon as the command for engaging the clutch 9, received by means of the lever 81, ceases to exist, the spring 75 is operable to withdraw sleeve 70 thereby allowing the pins 51 and the disk 50 to withdraw from the flywheel 5 with the additional help of the spring 58 in order to deactivate the power take-off.

Figure 3:
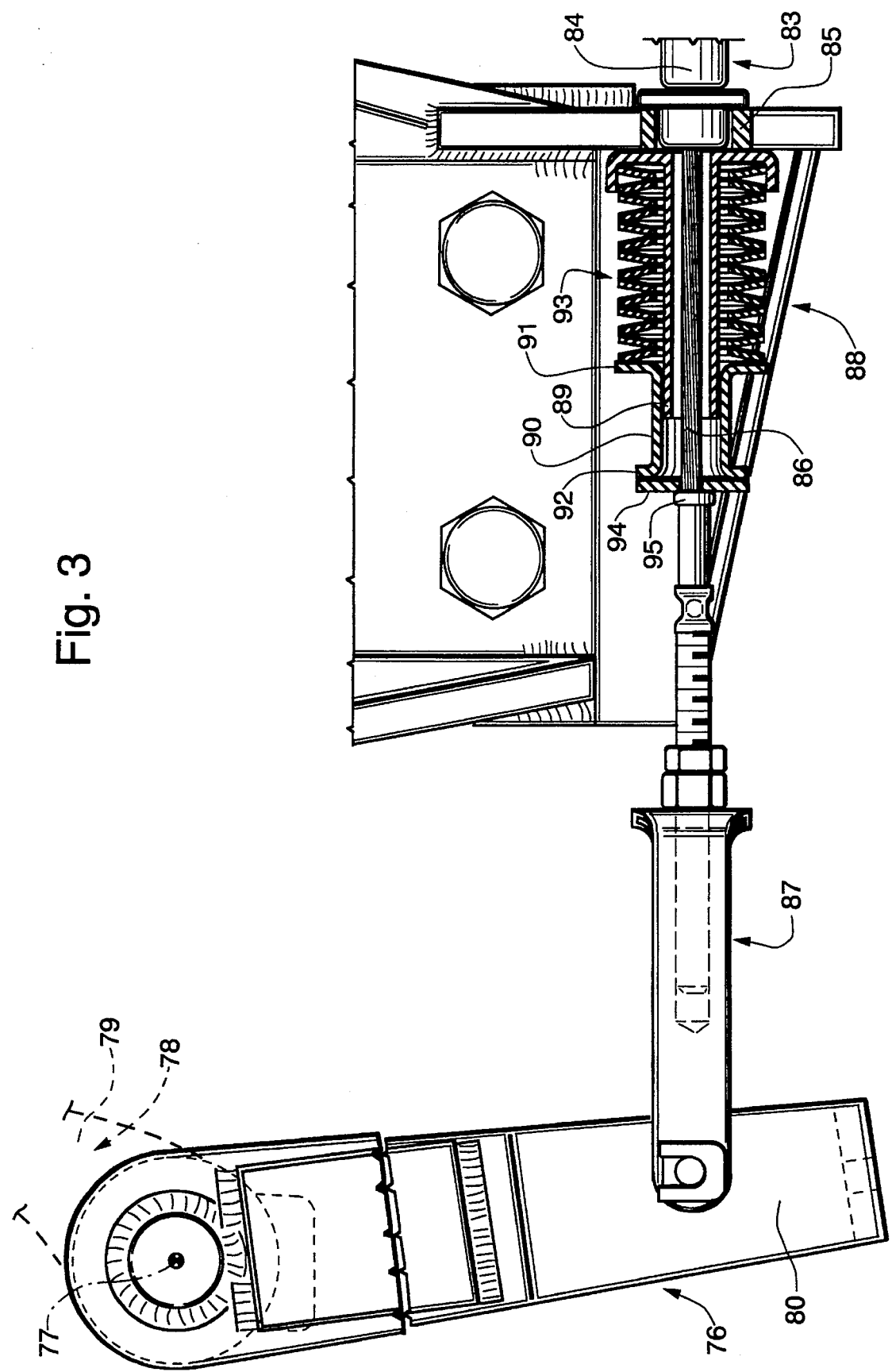
FIG. 3 shows an alternative embodiment of a detailed portion of FIG. 2.

With reference to FIGS. 1 and 3, spring 75 associated with clutch 9 may be replaced, in an alternative arrangement, by an elastic device 88 for setting and maintaining clutch 9 in the open or released position, and, in this case also, for enabling smooth, gradual engagement of clutch 9. Device 88 comprises a first sleeve 89, fitted integrally with plate 85 and extending around cable 86 towards the arm 80, and a second sleeve 90 fitted in axially sliding manner to the first sleeve 89 and terminating at opposite ends with respective outer flanges 91 and 92. Flange 91 defines a stop member for one end of a set of Belleville washers 93 aligned between flange 91 and plate 85, while flange 92 is arranged to contact a plate 94 in turn contacting an abutment member 95 on member 87.

Figure 4:
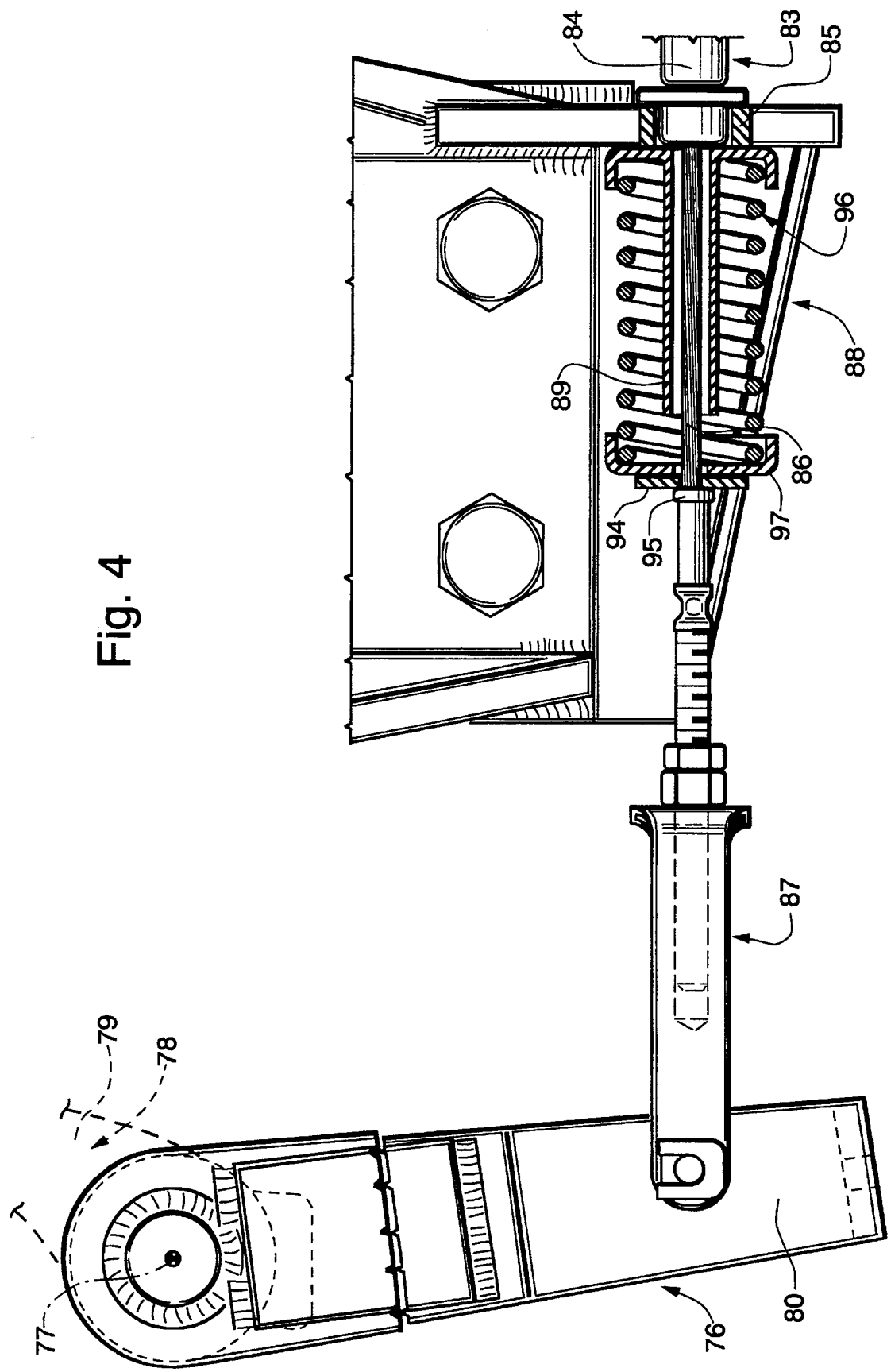
FIG. 4 shows a second alternative embodiment of a detailed portion of FIG. 2.

According to a further alternative embodiment also shown in FIG. 4, the Belleville washers 93 are replaced by an ordinary helical compression spring 96 fitted to sleeve 89 while sleeve 90 is replaced by a cap 97 housing one end of spring 96 and also arranged to contact plate 94.

The rigidity of the washers 93 and the spring 96 is such as to regulate the force with which clutch 9 is engaged in order to ensure smooth gradual engagement without the occurrence of undesired shocks.

In actual use, when the command for engaging the clutch 9, received by means of the lever 81 controlled by the operator, ceases to exist (as a result of repositioning the handle 81 in the idle position or by accidental failure of the flexible connection 83), arm 80 is so operated, via member 87 and by springs 93 or spring 96 via respective sleeve 90 or cap 97, as to rotate lever 76 clockwise (with reference to FIG. 2), move sleeve 70 axially in relation to sleeve 35 into the withdrawn position, and so release clutch 9 and deactivate the power take-off as already explained.

As opposed to known clutch assemblies, therefore, in addition to being reliable in operation and relatively simple to produce, assembly 1 also offers the advantage of safeguarding the operator or any bystanders in the vicinity of the tractor in the event, for example, of inadvertent snapping of the flexible connection between the lever 81 and the arm 80 during operation of the power take-off. In this case, in fact, when the external command of the operator for engaging the clutch fails, both spring 75 and device 88 provide for immediately releasing clutch 9 and deactivating the power take-off. In other words, clutch assembly 1 as described above prevents the power take-off from being activated under any condition other than voluntarily by the operator.

Considering that the power take-off of a tractor is not engaged during a considerable part of the lifetime of the tractor, e.g. during transport or complete deactivation of the tractor, it will be appreciated that the present invention offers the further advantage to have the springs 58 and 75 or 88 in a non-compressed condition for most of the time thereby increasing the lifetime thereof.

Having thus described the invention, what is claimed is:

1. In a vehicle clutch assembly having a first clutch interposed between a motor drive shaft and a transmission of the vehicle and a second clutch interposed between said drive shaft and an output shaft defining a power take-off of the vehicle, the improvement comprising:

an elastic means for maintaining the second clutch in a released position wherein said output shaft is operatively disconnected from said drive shaft, said elastic means being operable to exert a force in a first direction; and manually operated actuating means for controlling the second clutch, said actuating means exerting a force in a second direction opposite to said first direction of the force exerted by said elastic means and urging the second clutch to an engaged position wherein said motor drive shaft and said output shaft are operatively interconnected.

2. The clutch assembly of claim 1 wherein said second clutch includes first and second disk bodies having a common axis of rotation and being movable relative to one another along said axis of rotation for engaging a friction disk, said actuating means comprising:

a plurality of push rods for moving said first and second disk bodies towards each other;

means for activating said push rods; and a first manually operated lever for controlling said activating means.

3. The clutch assembly of claim 2 wherein said activating means further includes a plurality of second levers rotatable about respective first axes perpendicular to said axis of rotation of said disk bodies and a thrust collar movable coaxially with said axis of rotation for rotating said second levers about said respective first axes, said elastic means being interposed between said second levers and said thrust collar.

4. The clutch assembly of claim 3 wherein said elastic means comprises at least one compression spring.

5. The clutch assembly of claim 2 wherein said activating device comprises a number of second levers rotatable about respective first axes perpendicular to said axis of rotation of said bodies, a thrust collar movable coaxially with said axis of rotation for rotating said second levers about said respective first axes and a third lever for activating said collar, said elastic means being interposed between the first lever and the third lever.

6. The clutch assembly of claim 5 wherein said actuating means further comprises a connecting member connecting said first lever to said third lever, said elastic means being operatively associated with said connecting member.

7. The clutch assembly of claim 6 wherein said elastic means comprises a plurality of adjacent Belleville washers.

8. The clutch assembly of claim 6 wherein said elastic means comprise a helical compression spring.

9. The clutch assembly of claim 6 wherein said activating device further comprises at least one rocker arm, each said rocker arm being fitted to a respective said second lever, each said rocker arm having an intermediate portion connected to and rotating in relation to the respective said second lever and a first arm contacting a surface fixed in relation to said first axes; each said rocker arm also having a second arm cooperating with an end of a respective said push rod.

10. The clutch assembly of claim 9 further comprising an angular lock means for releasably maintaining said first lever in two given angular positions.

* * * * *